United States Patent [19]

Kozakai et al.

[11] Patent Number: 4,527,204
[45] Date of Patent: Jul. 2, 1985

[54] REMOTE CONTROL SYSTEM

[75] Inventors: Daisuke Kozakai; Toshio Amano, both of Tokyo; Kunio Nagai, Kanagawa, all of Japan

[73] Assignee: Sony Corporation, Tokyo, Japan

[21] Appl. No.: 466,165

[22] Filed: Feb. 14, 1983

[30] Foreign Application Priority Data

| Feb. 12, 1982 [JP] | Japan | 57-18874[U] |
| Feb. 12, 1982 [JP] | Japan | 57-18875[U] |
| Feb. 12, 1982 [JP] | Japan | 57-18876[U] |
| Feb. 19, 1982 [JP] | Japan | 57-22215[U] |

[51] Int. Cl.³ .......................... G11B 31/00; H04N 5/76
[52] U.S. Cl. .................. 360/33.1; 358/194.1; 360/79; 455/4
[58] Field of Search ............ 360/33.1, 79, 137; 358/335, 194.1; 455/603, 352, 344, 4, 353

[56] References Cited

U.S. PATENT DOCUMENTS

| 3,922,641 | 11/1975 | Gates, Jr. | 358/335 |
| 4,008,369 | 2/1977 | Theurer et al. | 455/4 |
| 4,031,548 | 6/1977 | Kato et al. | 358/335 |
| 4,272,784 | 6/1981 | Saito et al. | 358/335 |
| 4,301,542 | 11/1981 | Weintraub et al. | 455/353 |
| 4,334,242 | 6/1982 | Mangold | 358/194.1 |
| 4,337,480 | 6/1982 | Bourassin et al. | 358/194.1 |
| 4,392,022 | 7/1983 | Carlson | 358/194.1 |
| 4,394,691 | 7/1983 | Amano et al. | 455/603 |

Primary Examiner—Donald McElheny, Jr.
Attorney, Agent, or Firm—Lewis H. Eslinger; Alvin Sinderbrand

[57] ABSTRACT

A single, hand held remote control unit produces command signals used to control all operational aspects of a video tape recorder and an associated television receiver, and the video tape recorder and television receiver include switches that upon actuation can provide various interconnections so that all operating modes of the two units are possible. Actuation of the switches is performed by controllers, arranged at the particular units, and which receive the coded command signals from the remote control unit to set the switches in accordance with any of several keys that can be actuated on the remote control unit. In one aspect, depressing a single playback key at the remote control unit will produce coded signals received by the controllers to set the television receiver to an unused channel frequency and cause the video tape recorder to reproduce a prerecorded video tape, with the reproduced signal fed to the television receiver over that unused channel for display.

18 Claims, 4 Drawing Figures

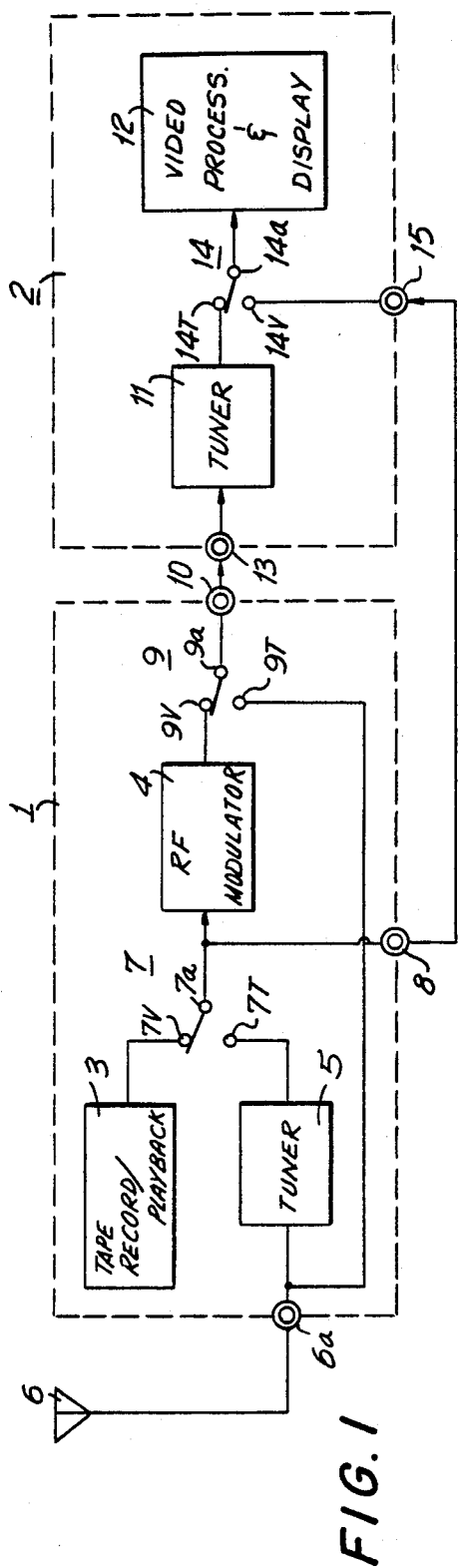
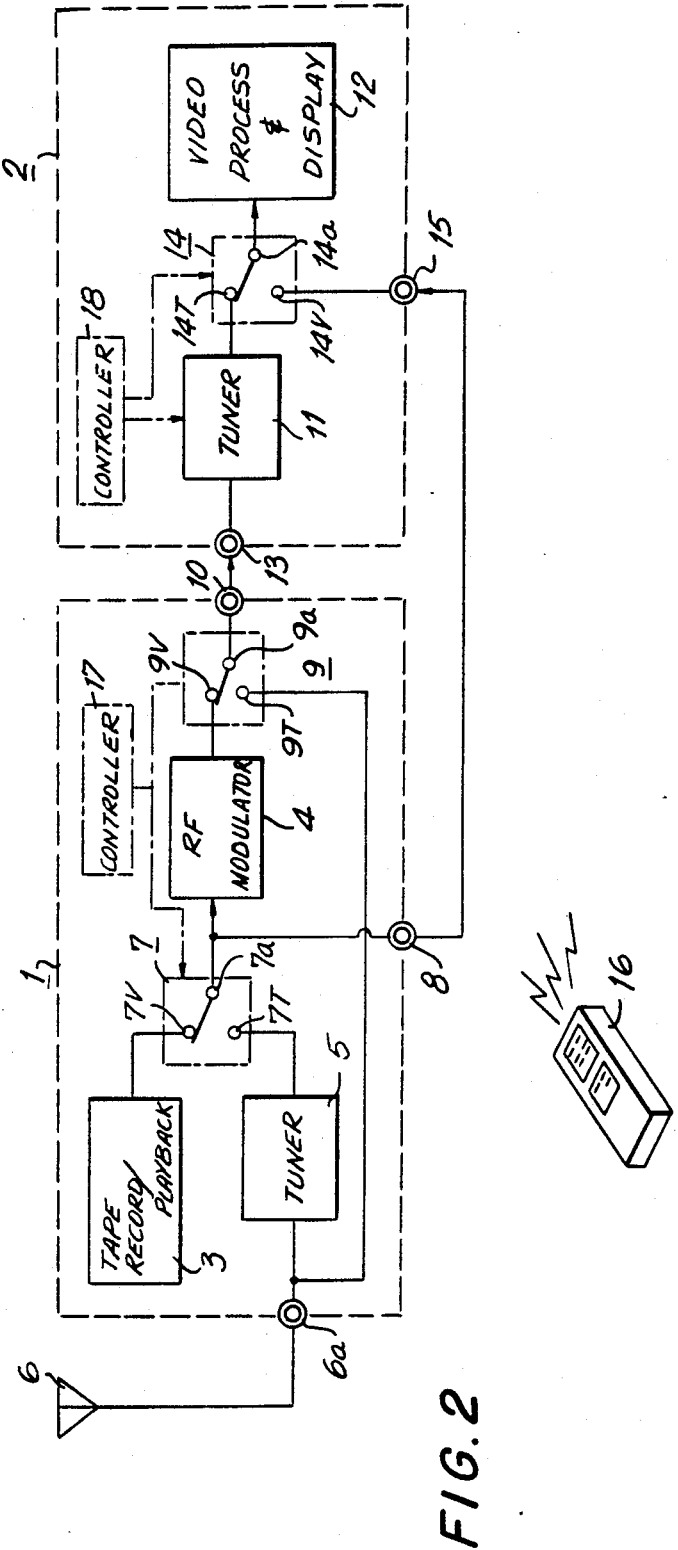
FIG.1
FIG.2

REMOTE CONTROL SYSTEM

BACKGROUND OF THE INVENTION

1. Field of the Invention

This invention relates generally to apparatus for remote control of the operation of a television receiver and a video tape recorder and, more particularly, is directed to apparatus to control the operation of a television receiver and a video tape recorder using a single wireless remote control unit.

2. Description of the Prior Art

In the use of a video tape recorder, according to the prior art, a conventional receiver must be connected by cables or wires to the video tape recorder in order to display the reproduced signals. The video tape recorder has connected to it the television antenna or leased video cable line, which provide the video programming source to be recorded. The television receiver is usually connected to the antenna or cable through the video tape recorder, so that the television receiver can receive and display programs independently of the video tape recorder.

The video tape recorder typically has its own twelve channel tuner and a selector switch that permits recording of one television channel signal, while passing a different television channel signal to the television receiver for viewing. When displaying recorded program material from the video tape recorder, the reproduced signal is modulated up to a high frequency of a standard television channel that has been selected beforehand, the channel selector of the television receiver is tuned to that channel, and the reproduced signal is processed and displayed in the conventional fashion. The channel that is selected for the high frequency modulation of the reproduced video signal, and to which the channel selector of the television receiver is set, is one that is a "dead" channel in that particular locale. That is, in order to avoid inter-channel interference a blank or unused channel is usually provided between the assigned television broadcast channels. The channel selector is set to one of these dead channels to receive the reproduced video from the video tape recorder. In the United States either channel 2 or 3 is selected as the dead channel, and in some foreign countries either channel 1 or 2 is selected. The high-frequency modulator of the video tape recorder usually can be selected to modulate the reproduced video signal to a high frequency corresponding to both of these two dead channels.

In some television receivers switched connections are provided that permit the video signals received at the video tape recorder to be tuned to a desired channel using the video tape recorder tuner, then by-pass the tuner of the television receiver, and have the tuned video signal processed and displayed by the television receiver in the normal manner.

It is also known, according to the prior art, to use a remote control unit to control the operation of a television receiver. Similarly, remote control units are known to control the video tape recorders. These remote control units are frequently termed remote commanders. Early remote control units were connected by a cable to the unit under control, however, more recent units are wireless and transmit signals, such as infrared signals or ultrasonic signals. The remote control unit associated with a television receiver can usually select channels, raise or lower the audio volume, mute the audio, and turn the power to the receiver on or off. Similarly, the remote control unit associated with the video tape recorder can usually select a channel in the tuner, operate the various controls associated with a tape recorder, such as record, play, and rewind, and turn the power to the video tape recorder on or off.

The video tape recorder and the television receiver are electrically interconnected so as to permit them to function in all modes, and at least two or three individual selector switches must be operated in order to set both units in the proper state for the particularly desired operating mode. Manual operation of these switches is very commonplace, but the use of remote control units has become more and more popular. Thus, for remote control of a video tape recorder and its associated television receiver it is necessary to use two individual hand-held remote control units, each having its full complement of controls, and each operating independently. The use of two individual hand-held remote control units is very inconvenient, requiring the manipulation of two sets of controls arranged on two separate individual units. Not only is handling the two units unwieldy but using all the various switches becomes complicated to the point where the average consumer simply chooses not to use both individual remote control units.

OBJECTS AND SUMMARY OF THE INVENTION

Accordingly, it is an object of this invention to provide apparatus for controlling the operation of a video tape recorder and a television receiver employing a single remote control unit.

It is another object of this invention to provide a wireless, hand-held, remote control unit for operating a video tape recorder and an associated television receiver to perform all functions of which both units are capable.

It is still another object of this invention to provide a wireless, hand-held, remote control unit for a video tape recorder and an associated television receiver that operates in conjunction with a control system to operate switches located at the video tape recorder and television receiver, respectively.

The present invention in one aspect provides a unitary wireless hand-held, remote control unit having two groups of function keys or switches that act to control the operation of the video tape recorder and its associated television receiver, respectively. The inventive apparatus includes control units to control selector switches located at interconnection nodes between subassemblies and at inputs and outputs in the video tape recorder and the television receiver, thereby interconnecting the various subassemblies of the video tape recorder and television receiver for operating in all various modes. For example, in one operating mode the inventive apparatus connects a program source derived from a prerecorded video tape to be fed through a high-frequency(radio-frequency) modulator to the tuner of the television receiver that has been tuned to a dead or empty channel, and then the video program signal is processed and displayed by the television receiver. In another mode, using the present invention the video tape recorder program source may be fed directly to the signal processing and display subsystem of the television receiver. In still another mode using the present invention the program source is derived from the television antenna input of the video tape recorder and fed to the tuner of the television receiver, where the video signal is processed and displayed.

The above, and other objects, features, and advantages of the present invention, will be apparent from the following detailed description of an illustrative embodiment that is to be read in conjunction with the accompanying drawings, in which the same reference numerals identify the corresponding elements and parts in the several views.

BRIEF DESCRIPTION OF THE DRAWINGS

FIG. 1 is a schematic block diagram illustrating a video tape recorder and an associated television receiver in which the remote control apparatus of this invention may be advantageously employed;

FIG. 2 is a schematic block diagram illustrating a video tape recorder and an associated television receiver interconnected according to an embodiment of this invention for remote control operation;

DESCRIPTION OF A PREFERRED EMBODIMENT

Figure 4:
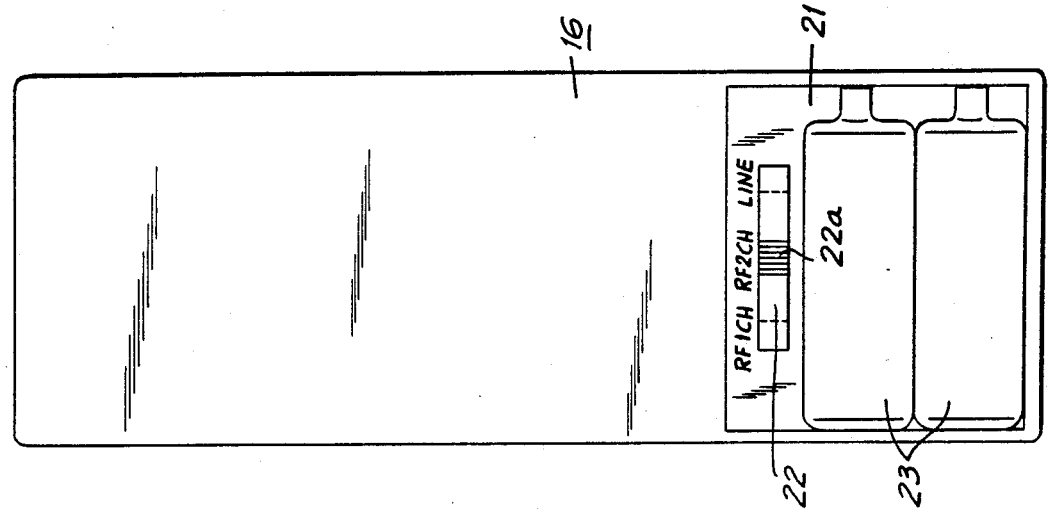
FIG. 4 is a bottom plan view of the hand-held remote control unit of FIG. 3.

Referring to the drawings in detail and, initially, to FIG. 1 thereof, it can be seen that video tape recorder 1 is operably connected to television receiver 2. Video tape recorder 1 has main video tape record and reproduction unit 3 that includes all of the electro-mechanical elements necessary to record and reproduce video signals on a magnetic tape. Video tape recorder 1 also includes high-frequency modulator 4 that converts a received raw video signal, as might be supplied from tape reproduction unit 3, into a modulated signal at radio frequency (RF) of an arbitrary channel, preferably a dead channel such as channel 2 or 3 in the United States or channel 1 or 2, elsewhere. Video tape recorder 1 also includes tuner section 5 which is substantially identical to a conventional television receiver tuner and has all the well-known elements thereof. The signal input to tuner 5 is supplied by television antenna 6 connected at antenna input terminal 6a. Selector switch 7 is provided to select the program source and, in that regard, operating switch 7 connects switch output terminal 7a to a composite video signal as provided from video tape reproduction unit 3 at terminal 7V or from television tuner 5 at terminal 7T. Thus, by action of switch 7, composite video signals from one of two sources are fed to RF modulator 4 and are also fed to video-out terminal 8. A second selector switch 9 is provided in video tape recorder 1 that feeds signals to output terminal 10, to which television receiver 2 is connected. More specifically, in a first position the output from RF modulator 4 at terminal 9V is connected to switch terminal 9a to provide a radio-frequency modulated signal at output terminal 10 at a frequency of a selected local dead channel. In a second position of selector switch 9, terminal 9a is connected to terminal 9T that is directly connected to television antenna 6. Thus, by operation of switch 9, it is possible to have either a radio-frequency modulated composite video signal or a raw video signal, as might be received from television antenna 6, connected directly to output terminal 10 of video recorder 1.

Television receiver 2 comprises the typical subsystems and controls and includes television tuner 11, as well as video processing circuitry and cathode ray tube display, shown generally at 12. For utilizing television receiver 2 with video tape recorder 1, switch 14 is provided to select either the video output signal from conventional tuner 11, as connected through terminals 14a and 14T of switch 14, or to connect, through terminals 14V and 14a, the video signals available at video-in terminal 15, which is connected to video-out terminal 8 of video tape recorder 1.

In the system shown in FIG. 1 of the operably interconnected video tape recorder 1 and television receiver 2, when a viewer wishes to watch a program reproduced by the tape reproduction subsystem 3 it is necessary to connect output terminal 7a of switch 7 to input terminal 7V and also to connect output terminal 9a to input terminal 9V. Switch 14 on television receiver 2 must also be operated to connect output terminal 14a to input terminal 14T and television tuner 11 must be operated to select a dead channel, for example, channel 2. Note that in the United States, typically either channel 2 or channel 3 will be a dead channel in almost all regions due to frequency spacing requirements of the FCC that are intended to preclude use of adjacent channels where possible and that, although not used in the United States, channel 1 is used in other countries around the world.

From the above it may be seen that it is quite inconvenient manually to make all the necessary connections involved in the several modes using the various selector switches and tuner switches. While use of the remote control units would eliminate manual operation of the various switches and controls, two separate unit is required for the video tape recorder and the television receiver, respectively. Manipulation of two separate remote control units is both cumbersome and problematic from the standpoint of keeping both units at hand.

Another mode of operation of the combined units shown in FIG. 1 is one in which it is desired to view a program on a video tape without passing the video through the tuner 11 of television receiver 2. In such case, the selector switches would be operated to set switch 7 to select the reproduced video signal at terminal 7V and switch 14 to terminal 14V to select this composite video signal, provided from video-out terminal 8 to video-in terminal 15. In a still different mode of operation, when a viewer desires to view a television program received by antenna 6, selector switches 9 and 14 on the video tape recorder must be operated to make the appropriate interconnections as described above. These various modes of operation all require actuation of switches on both of the units and if the switching is desired to be done remotely, then the two separate remote control units are required.

Figure 3:
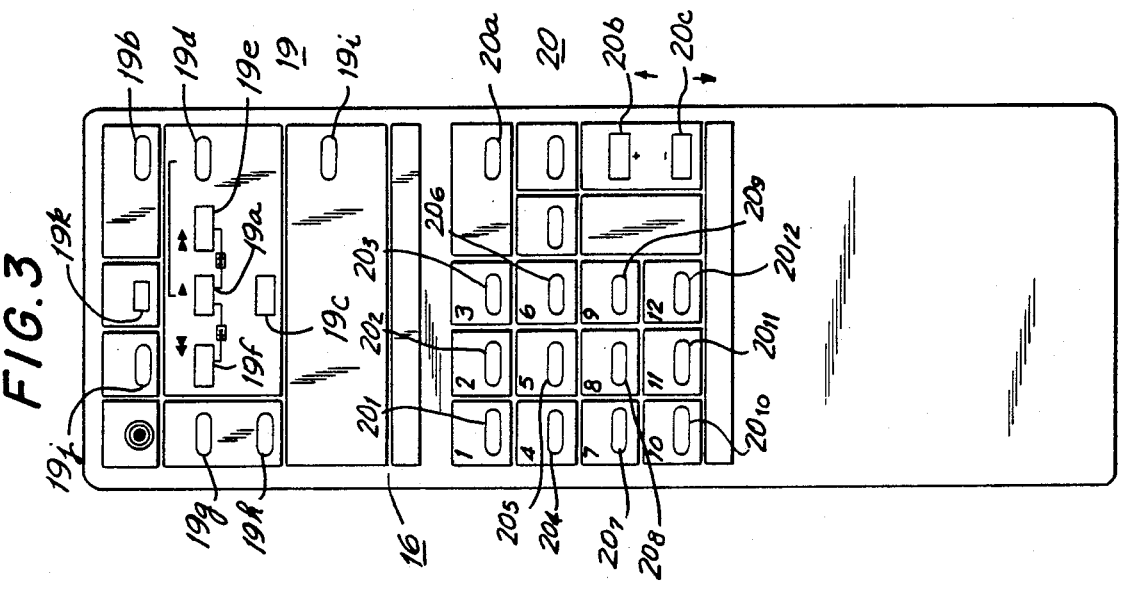
FIG. 3 is a top plan view of a hand-held remote control unit according to an embodiment of this invention.

A remote control system according to one aspect of the present invention is shown in FIGS. 2 and 3, in which elements common to the system of FIG. 1 have like reference numerals. The present invention provides a single wireless, hand-held, remote control unit 16 that operates to control both video tape recorder 1 and television receiver 2, simultaneously, by pressing only switches or buttons located on remote control unit 16. Remote control unit 16 produces and transmits control signals received by control unit 17 to control selector switches 7 and 9 of the video tape recorder 1, and remote control unit 16 also produces and transmits control signals received by control unit 18 to control selector switch 14 of television receiver 2 and also to control channel selection in television receiver tuner 11.

Control units 17 and 18 can be built according to any of several conventional designs for controllers of this kind. For example, mechanical operation of the various switches can be accomplished by solenoids or stepper motors, alternatively, "soft" switching could be accomplished by solid-state devices. Operation of either of these two exemplary embodiments can be initiated by receiving the appropriate command signals from remote control unit 16. The command signals can be infrared signals received in "line of sight" by the control unit, with differentiation among the several command signals accomplished by coding of the command signals. Again, any of several of the conventional kinds of signal coding can be advantageously utilized.

The command buttons of remote control unit 16 are arranged as shown in FIG. 3 and, more specifically, play button 19a is provided to place video tape recorder 1 in a playback mode, that is, to cause tape reproduction unit 3 to produce appropriate video output signals. Remote unit 16 is also provided with power switch 19b, which acts to turn on or off video tape recorder one. Button 19c also pertains to video tape recorder 1 and acts as the stop button to stop reproduction unit 3 from producing output signals. Button 19d is a record button that activates video tape recorder 1 to record incoming video signals. In the interest of clarity, the various connections for the tape unit 3 to permit it to record incoming video signals are not shown, that is, the connection between the output of video tape recorder tuner 5 and the input of video record unit 3 is not shown. Buttons 19e and 19f initiate the well-known fast forward and rewind functions, respectively. Buttons 19g and 19h are the channel select buttons and cause tuner 5 of video tape recorder to scan up or down, respectively. Button 19i is a pause button that will cause the tape record and reproduction 3 of video tape recorder 1 to momentarily stop, whether recording or reproducing video signals. Button 19j is a monitor switch for supplying a reproduced signal from video tape recorder 1 to television receiver 2 through the line connected between video-out terminal 8 and video-in terminal 15. Button 19k is a locking switch that prohibits operation of other control buttons on remote command unit 16 when recording button 19d has been depressed.

The control buttons in the lower section portion of remote command unit 16 control television receiver 2 and all utilize the prefix number 20. More specifically, 20a is the power on/off button for television receiver 2 and switches $20_1$ through $20_{12}$ are all channel select buttons corresponding to the twelve possible channels available in typical television receivers. Note that in this embodiment the channel numbers run from one to twelve, whereas in conventional televisions utilized in the United States the channel numbers run from two through thirteen. Buttons 20b and 20c are the audio volume controls and serve to cause the volume to be increased or decreased, respectively.

The operation of many of the above-described controls relative to both the video tape recorder and to the television receiver 2 is straight forward and well known. The present invention provides two internally arranged controllers 17 and 18 operating to control the selector switches of the video tape recorder 1 and the television receiver 2, respectively, and remote command unit 16 produces and transmits the appropriate control signals to operate these two controllers. When play button 19a is depressed, remote command unit 16 transmits two individual and identifiable control signals $S_0$ and $S_1$, as indicated, these signals are preferably infrared radiation signals that are received by controllers 17 and 18. Command signal $S_0$ is received by controller 17 that controls the connection state of switches 7 and 9. More specifically, depressing play button 19a causes command signal $S_0$ to be produced and received at controller 17, which acts to connect terminals 7V and 7a of switch 7 and to connect terminals 9a and 9V of switch 9. Signal $S_1$ is detected by controller 18, which operates switch 14 to connect contact 14a with contact 14T and sets television receiver tuner 11 to a dead channel, which in this example is channel 2. Thus, the output signals from video tape recorder tape unit 3 may be fed to the video signal processor and cathode ray tube display 12 of television receiver 2 by depressing only one button (play button 19a) on combined remote command unit 16. Additionally, there is the option of manually connecting antenna 6 to output terminal 10 of video tape recorder 1 by manually moving selector switch 9 to connect terminals 9T and 9a.

When it is desired to monitor the video signal being recorded on video tape by unit 3 of video tape recorder 2, monitor button 19j is depressed. The signal path from video-out terminal 8 and video-in terminal 15 of video tape recorder 1 and television receiver 2, respectively, is used in the tape monitor mode. Pressing of monitor button 19j causes remote command unit 16 to produce and transmit two individual signals, $S_2$ and $S_3$. The signal $S_2$ is detected by controller 17 that operates switch 7 to connect terminal 7T with terminal 7a and controller 17 also operates switch 9 to connect terminals 9T and 9a. Note that the switch connections to permit tape record and reproduce unit 3 to record are not shown in the interest of clarity. The signal path to monitor the signal from tuner 5 that is being recorded in tape record unit 3 is from switch terminal 7a to video-out terminal 8. Controller 18 receives control signal $S_3$ and operates switch 14 to connect input terminal 14V with switch output terminal 14a, in order to connect the video-in signal at terminal 15 to video processing and cathode ray tube display subassembly 12.

When the viewer desires to view a television program received at antenna 6, he may operate switch 14 to connect terminals 14T and 14a, thereby feeding the signal received by antenna 6 through television receiver tuner 11 to display unit 12. Note that switch 9 had been previously actuated by signal $S_2$ to connect terminals 9a and 9T, thus providing the received video signal at antenna terminal 10 of video tape recorder 1.

The above explanation of one aspect of the invention has been directed to the operation of a video tape recorder as the principal program source, with the unit being controlled remotely by the inventive apparatus. This function is not exclusive and remote control unit 16 is also used to control television receiver 2, for example, when any one of the channel selecting buttons $20_1$ through $20_{12}$ are depressed, switch 9 in video tape recorder 1 is also actuated. Moreover, when the dead channel is selected by the appropriate channel selecting button, for example, if channel 2 is a dead channel, switch $20_2$ is depressed, then remote command unit 16 generates signals $S_4$ and $S_{CH2}$. Signal $S_4$ is received by controller 17 and operates switch 9 to connect contact 9a with contact 9V, which is the output of RF modulator 4. Signal $S_{CH2}$ is detected by controller 18 and actuates tuner 11 of television receiver 2 to select the dead channel, that is, channel 2, so that the high-frequency modulated signal produced by RF modulator 4 is fed to tuner 11 of television receiver 2. When any channel is selected other than the predetermined dead channel, which in this example is channel 2, remote control command unit 16 generates signals $S_5$ and $S_{CHn}$, where n is any of the remaining channels that is, channels 1, 3, 4, up to 12. Signal $S_5$ is received by controller 17 and sets switch 9 to connect output terminal 9a with antenna terminal 9T. Signal $S_{CHn}$ is received by controller 18, which acts to set tuner 11 to tune the channel corresponding to the particular button that was selected on remote command unit 16, that is, $20_1$ or $20_3$ through $20_{12}$. By following the above teaching of the present invention, it can be seen that a viewer may view a broadcast television program on a television receiver associated with a video tape recorder by pressing only the channel selecting buttons, that is, those buttons corresponding to buttons $20_1$ through $20_{12}$, on a single remote control unit 16 and without making manual switch selections on the units themselves or without requiring two remote control units.

Referring now to FIG. 4, the back of remote command unit 16 is shown and, specifically, battery box 21 contains multiple-position switch 22 and batteries 23. Switch 22 has a selecting or slide member 22a that can be moved among any of three positions corresponding to RF1CH, RF2CH, and LINE. When selecting member 22a of switch 22 is set at RF1CH and play button 19a is depressed as discussed above, remote command unit 16 produces and transmits signal $S_0$ and signal $S_6$. The signal $S_0$ is received by controller 17 and operates switches 7 and 9 to connect tape unit reproducing output signals at terminal 7V to switch output 7a, whereby the reproduced signal is passed through RF modulator 4 and through switch 9 to provide the video signal at output terminal 10. Signal $S_6$ is received by controller 18 and sets tuner 11 to tune to channel 1, which has been selected as the dead channel by slide switch 22 by setting sliding element 22a at RF1CH. Signal $S_6$ also causes controller 18 to control switch 14 to select input terminal 14T, which feeds the output from tuner 11 to video processor and display circuit 12. In this mode, RF converter 4 of video tape recorder 1 converts the input video signal to a high-frequency signal corresponding to that assigned to channel 1.

When channel 1 is not a dead channel and it is necessary to utilize channel 2, switch 22 is set to the RF2CH position and play button 19a is depressed. This causes remote command unit 16 to produce and transmit signals $S_0$ and $S_1$. The operation of the system of FIG. 2 in response to these two signals has been described hereinabove and is therefore not repeated.

When sliding element 22a of switch 22 is placed in the LINE position the remote command unit 16 will generate signals $S_0$ and $S_3$, with signal $S_0$ controlling switches 7 and 9 and signal $S_3$ controlling switch 14. As indicated above, when signals $S_0$ and $S_3$ are present, the movable contacts of the control switches are all set at the V position, in other words, switch 7 is set to connect 7V and 7a, switch 9 is set to connect 9V and 9a, and switch 14 is set to connect switch 14V and 14a. This provides the output from tape reproducing unit 3 directly to video signal processor and cathode ray tube display 12 of television receiver 2 by using the monitor line that connects video-out terminal 8 and video-in terminal 15 connected to switch terminal 14V, thereby bypassing tuner 11 of television receiver 2. Note that in all cases when play button 19a is depressed video tape recorder 1 is placed in the playback mode.

In order to summarize the various signals produced and transmitted by remote command unit 16 in response to the operator pressing the various buttons thereon, it is noted that when depressing play button 19a, and when switch 22 is arranged at the RFCH1 position, signals $S_0$ and $S_6$ are produced, when switch 22a is in the RFCH2 position, signals $S_0$ and $S_3$ are produced. Depressing monitor switch 19j causes remote control unit 16 to produce signals $S_2$ and $S_3$. When switch 22 is set at the RFCH2 position, depressing button $20_2$ produces signals $S_4$ and $S_{CH2}$, pressing any of the other channel buttons, that is, buttons $20_1$ or $20_3$ through $20_{12}$, will result in the production of signal $S_5$ and $S_{CHn}$, where n is the corresponding channel number. Conversely, when the RFCH1 position is selected on switch 22, pressing the channel 1 button, $20_1$, will produce signal $S_4$ and signal $S_{CH1}$ and depressing any of the other channel buttons, corresponding to channels 2 through 12, will produce signal $S_5$ and signal $S_{CHn}$, where n is the channel selected, excluding channel 1.

Now that the various signals that can be produced and transmitted by remote command unit 16 have been tabulated, it is advantageous to indicate the corresponding operations of the switches and of the tuners shown in FIG. 2. Specifically, when signal $S_0$ is received by controller 17, switch 7 is operated to the 7V position and switch 9 is operated to the 9V position; when signal $S_1$ is received by controller 18, switch 14 to the 14T position and tuner 11 is set to channel 2; when signal $S_2$ is received by controller 17, switch 7 is operated to the 7V position and switch 9 is operated to the 9T position; when signal $S_3$ is received by controller 18, switch 14 is operated to the 14V position; when signal $S_4$ is received by controller 17, switch 9 is operated to the 9V position when, signal $S_5$ is received by controller 17, switch 9 is operated to the 9T position; when signal $S_6$ is received by controller 18, switch 14 is operated to the 14T position and channel 1 is set on tuner 11. The general rule is that switch signal $S_{CHn}$ will operate to select the channel in tuner 11 corresponding to the button selected. The only exception being channels 1 and 2, which depend upon the position of switch 22 on the back of remote control unit 16. When slider 22a is arranged at RF1CH, then that channel is the dead channel and corresponds to the high frequency to which the signal reproduced from the video tape is modulated before being fed to television receiver tuner 11, whereas when switch 22 is set at RF2CH, then the dead channel is channel 2 and the high frequency at which the reproduced video signal is modulated in modulator 4 is the assigned broadcast frequency of channel 2.

Having specifically described an illustrative embodiment of this invention with reference to the accompanying drawings, it is to be understood that the invention is not limited to that precise embodiment, and that various changes and modifications, among which several have been mentioned, may be effected therein by one skilled in the art without departing from the scope or spirit of the invention as defined in the appended claims.

What is claimed is:

1. An apparatus for controlling operation of a video tape recorder and an associated television receiver, comprising:

switch means selectively operable to connect a reproduced video signal from said video tape recorder to an input of said television receiver or to connect an external video signal to said input of said television receiver, said switch means including first and second switch means operably arranged in said video tape recorder and said associated television receiver, respectively;

control means responsive to received command signals for controlling said switch means to connect either said reproduced video signal or said external video signal to said input of said television receiver, said control means including first and second control means, operably arranged in said video tape recorder and said associated television receiver, respectively, for responding to a plurality of different command signals, operation of said first switch means being controlled by said first control means and operation of said second switch means being controlled by said second control means; and remote control means remotely located from said video tape recorder and associated television receiver and producing said plurality of different command signals in response to which said control means causes said switch means to connect either a reproduced video signal or an external video signal to said input of said television receiver for visual display thereby.

2. An apparatus for controlling operation of a video tape recorder and an associated television receiver according to claim 1, in which said plurality of different command signals produced by said remote control means comprises a first group of command signals to which only said first control means is responsive and a second group of command signals to which only said second control means is responsive.

3. An apparatus for controlling operation of a video tape recorder and an associated television receiver according to claim 1, in which said television receiver includes a video channel tuner and said second control means is also operably connected to said video channel tuner to cause said tuner to select one of a plurality of video channels in response to a corresponding command signal from said remote control means.

4. An apparatus for controlling operation of a video tape recorder and an associated television receiver according to claim 3, in which said second switch means has a first input connected to an output of said video channel tuner and a second input connected to a video monitor line which is connected to an output of said first switch means, said second switch means being operably controlled by said second control means to connect either said monitor line or an output of said tuner for visual display by said television receiver in response to corresponding respective command signals from said remote control means.

5. An apparatus for controlling operation of a video tape recorder and an associated television receiver according to claim 4, in which said remote control means includes a line switch that upon actuation causes said remote control means to produce one of said plurality of command signals in response to which by said second control means operates said second switch means to connect said monitor line for visual display by said television receiver.

6. An apparatus for controlling operation of a video tape recorder and an associated television receiver according to claim 3, in which said remote control means includes a dead channel selector switch and a video tape recorder play switch operable to cause said remote control means to produce selected ones of said plurality of command signals for receipt by said second control means to said tuner to be set to a dead channel as determined by said dead channel selector switch.

7. An apparatus for controlling operation of a video tape recorder and an associated television receiver according to claim 3, in which said remote control means includes a plurality of channel selector switches that upon actuation cause said remote control means to produce corresponding ones of said plurality of command signals in response to which said second control means operates said video channel tuner to select a channel corresponding to said channel selector switch actuated at said remote control means.

8. An apparatus for controlling operation of a video tape recorder and an associated television receiver according to claim 1, in which said video tape recorder includes a modulator for converting said reproduced video signals to a predetermined higher frequency corresponding to a selected television broadcast channel frequency and said first switch means includes means for selectively connecting either an output of said modulator or said external video signal to said input of said television receiver.

9. An apparatus for controlling operation of a video tape recorder and an associated television receiver according to claim 1, in which said video tape recorder includes a video channel tuner connected to receive said external video signal and having an output connected to a first input of said first switch means, said first switch means having a second input connected to an output from a video tape reproducing portion of said video tape recorder, said first switch means being selectively controlled by said first control means in response to selected command signals from said remote control means to connect either said first or said second inputs to an output of said first switch means for visual display by said television receiver.

10. An apparatus for remotely controlling operation of a video tape recorder and an associated television receiver to display on said television receiver reproduced signals from said tape recorder or to display on said television receiver video signals from an external source, comprising:

selector switch means operable to connect the reproduced video signal from said video tape recorder to an input of said television receiver for display thereon or to connect the video signals from an external source to said input of said television receiver for display thereon, said selector switch means including first and second selector switches arranged in said video tape recorder and said associated television receiver, respectively;

control means operably connected to said switch means and responsive to command signals for controlling said switch means to connect either said reproduced video signal or said video signal from an external source to said input of said television receiver for display thereon, said control means including first and second control means operably arranged in said video tape recorder and said associated television receiver, respectively, for controlling said first and second switch means, respectively, in response to corresponding coded command signals;

and unitary hand-held remote control means located remotely from said video tape recorder and associated television receiver and having a plurality of keys which are manually operable for producing a plurality of respective coded command signals, said control means responding to said command signals to control said switch means to connect said reproduced video signal or said video signal from an external source to said input of said television receiver for visual display thereon.

11. An apparatus for remotely controlling operation of a video tape recorder and an associated television receiver according to claim 10, in which said plurality of coded command signals produced by said remote control means comprises a first group of coded command signals to which only said first control means is responsive and a second group of coded command signals to which only said second control means is responsive.

12. An apparatus for remotely controlling operation of a video tape recorder and an associated television receiver according to claim 10, in which said television receiver includes a channel tuner and said second control means is arranged to operate said channel tuner to select one of a plurality of channels in response to a coded command signal produced by said remote control means upon actuation of a key corresponding to the selected channel.

13. An apparatus for remotely controlling operation of a video tape recorder and an associated television receiver according to claim 12, in which said second selector switch has a first input connected to an output of said video signal tuner and a second input connected to a video monitor line, said video monitor line also connected to an output of said first selector switch, said second selector switch being controlled by said second control means to connect either said video monitor line or an output of said channel tuner for visual display by said television receiver.

14. An apparatus for remotely controlling operation of a video tape recorder and an associated television receiver according to claim 13, in which said remote control means includes a line switch that upon actuation causes said remote control means to produce one of said plurality of coded command signals for reception by said second control means to operate said second selector switch to connect said monitor line for visual display by said television receiver.

15. An apparatus for remotely controlling operation of a video tape recorder and an associated television receiver according to claim 12, in which said remote control unit includes a dead channel selector switch for selecting one channel as a dead channel and a play switch actuation of which produces at least one of said plurality of coded command signals indicating the dead channel selected by said dead channel selector switch in response to which said second control means operates said tuner to be set to said selected dead channel.

16. An apparatus for remotely controlling operation of a video tape recorder and an associated television receiver according to claim 12, in which said remote control means includes a plurality of channel selector keys which upon actuation cause said remote control means for operating said tuner to select a channel corresponding to said channel select key actuated at said remote control means.

17. An apparatus for remotely controlling operation of a video tape recorder and an associated television receiver according to claim 10, in which said video tape recorder includes a modulator for converting said reproduced video signals to a predetermined higher frequency corresponding to a known television broadcast channel frequency and said first selector switch includes means for connecting either an output of said modulator of said video signals from an external source to said input of said television receiver for display thereon, said first selector switch controlled by said first control means in response to said coded command signals produced by said remote control means upon actuation of corresponding keys.

18. An apparatus for remotely controlling operation of a video tape recorder and an associated television receiver according to claim 10, in which said video tape recorder includes a video signal tuner connected to receive said video signals from an external source and producing an output signal from a first input of said first selector switch, said first selector switch having a second input connected to said reproduced video signal, said first selector switch being controlled by said first control means, in response to coded command signals from said remote control means produced upon actuation of corresponding ones of said keys, to connect either said first or said second inputs to said television receiver for display thereon.

* * * * *